March 24, 1970      M. L. DESNICK      3,502,125

ARTICLE MODIFYING APPARATUS

Filed June 5, 1967      4 Sheets-Sheet 1

INVENTOR.
MANDEL L. DESNICK
BY
Carlson, Carlson & Sturm
ATTORNEYS

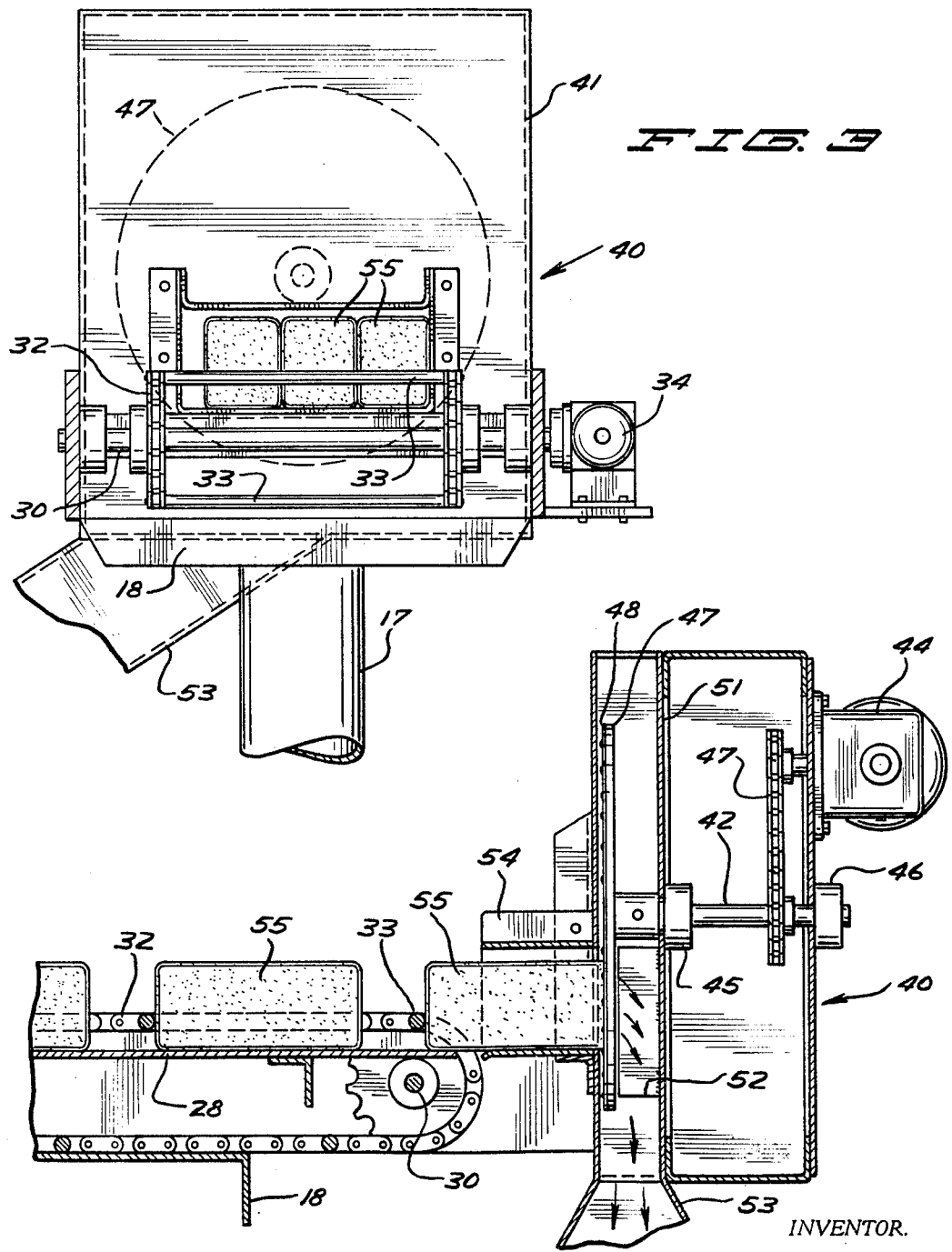

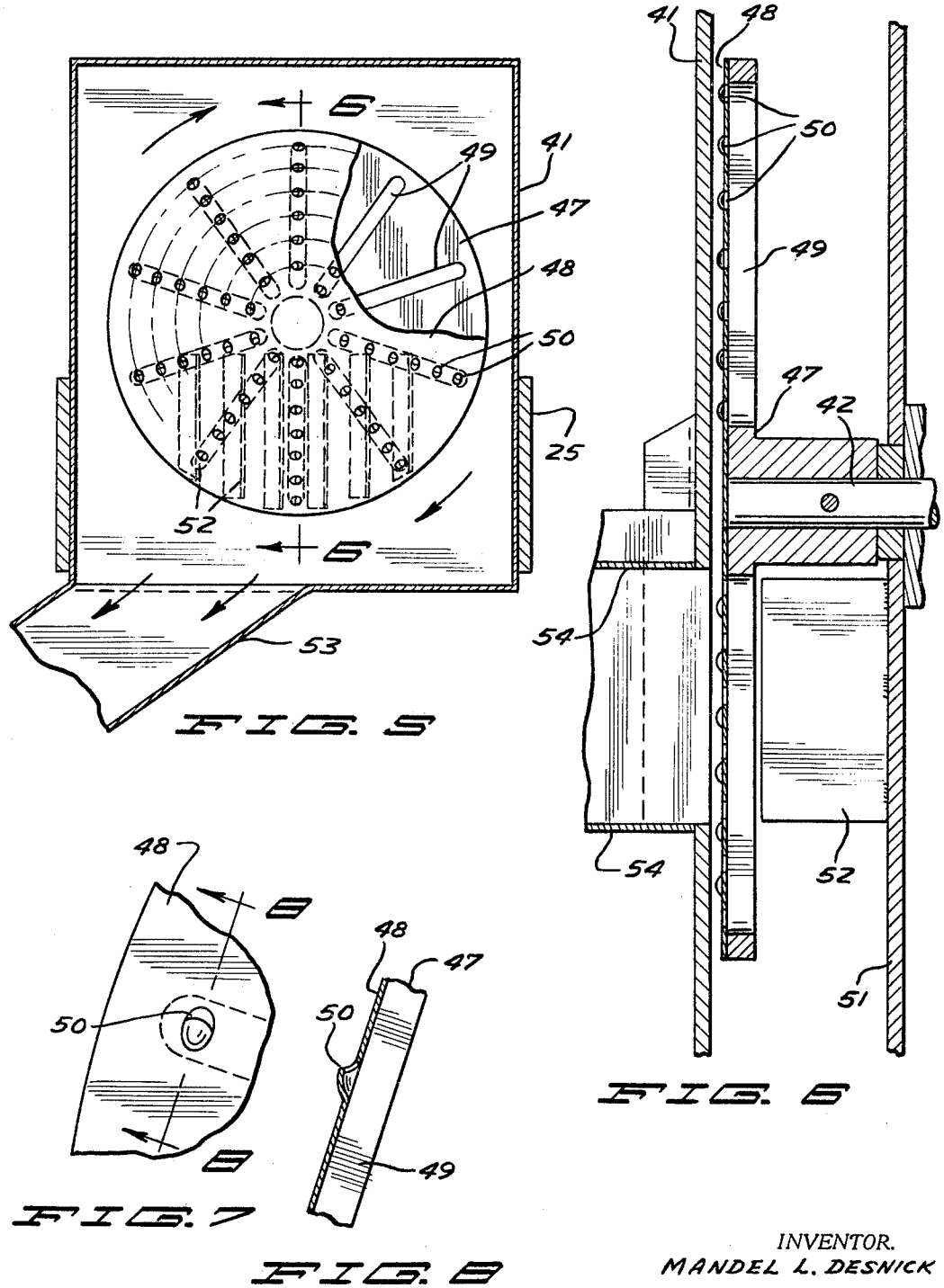

March 24, 1970 M. L. DESNICK 3,502,125
ARTICLE MODIFYING APPARATUS
Filed June 5, 1967 4 Sheets-Sheet 4
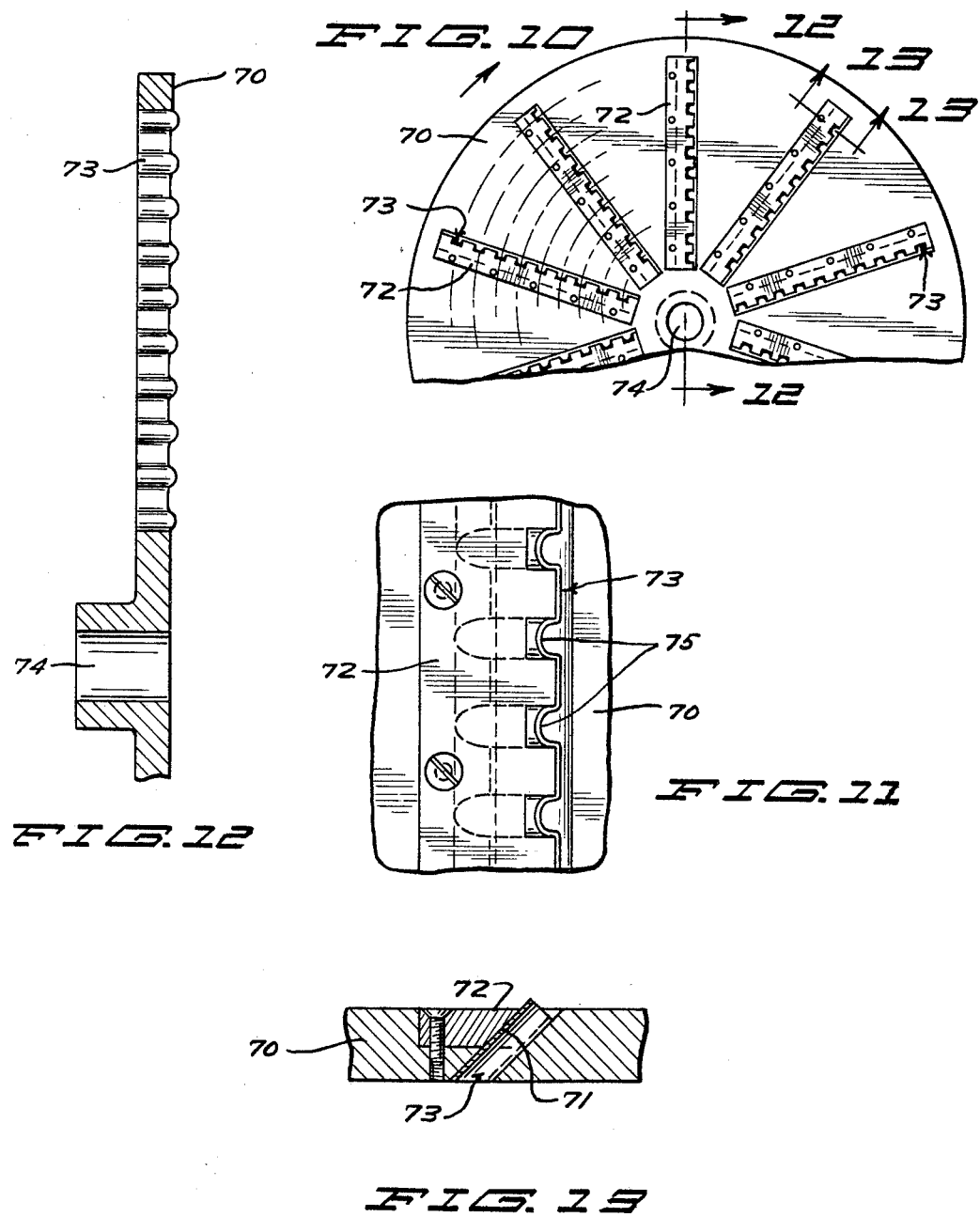
INVENTOR.
MANDEL L. DESNICK
BY
Carlsen, Carlsen & Sturm
ATTORNEYS United States Patent Office 3,502,125
Patented Mar. 24, 1970

3,502,125
ARTICLE MODIFYING APPARATUS
Mandel L. Desnick, 1832 E. 38th St.,
Minneapolis, Minn. 55407
Filed June 5, 1967, Ser. No. 643,603
Int. Cl. B02c 7/125, 11/04, 17/02
U.S. Cl. 146—78                                  3 Claims

ABSTRACT OF THE DISCLOSURE

Apparatus for converting, for example, foodstuffs prepared or stored in large sizes to particulate material or material having a discrete size and shape characteristic, which includes the combination of a material modifying apparatus in the form of a rotating disc having material cutting members, material transporting portions disposed adjacent the cutting members and knife-like material severing members for controlling the size of the modified material and material receiving and conveying means adapted to controllably feed material to be modified in such a manner as to allow uninterrupted operation through the utilization of a speed control conveyor apparatus having a stall torque less than that of the drive mechanism for the material modifying apparatus.

---

As an illustrative application for my invention, the mass manufacture of foodstuffs known as pizza pie requires large quantities of freshly shredded cheese to be combined either manually or automatically with other foodstuffs in a prepared assemblage to be cooked or frozen for storage prior to cooking. One of the requirements of such a process is that the cheese be stored in a convenient form, as manufactured, in large loaves, and to be available in a fresh state at the time it is to be assembled into a foodstuff. These requirements have precluded the preparation of large quantities of shredded cheese and storing the material in this form prior to use in assembly of the foodstuff articles. It is also necessary to provide the modified cheese in the form of shreds of predetermined length and cross-sectional area which may easily be done by hand but has heretofore been unavailable in automatic and semiautomatic equipment.

In the present invention, apparatus is provided which may be adjustably and easily positioned adjacent areas in which the product is to be used. The apparatus includes a frame having a discharge end at which the article modifying operation is performed by the use of a motor driven rotating disc-like article modifying assembly. The apparatus further supports and carries an article supporting member that is disposed in operative cooperative relationship with a conveyor, which may be of the chain link type, that is driven by suitable motive power means that is adjustable in operation so that articles to be modified may be continuously applied to the article modifying appartus at a rate which will provide for efficient and carefree operation. Further, the motive power means for the article modifying apparatus and the article receiving and conveying apparatus are balanced in maximum torque power output to prevent damage to the apparatus or the articles in the event of unforeseen operational difficulties.

It is therefore an object of my invention to provide novel and improved article modifying apparatus.

It is a further object of my invention to provide an improved article modifying apparatus which provides increased control over the quality of the product produced.

A further object of my invention is to provide a novel and improved article modifying apparatus that is of increased efficiency.

A still further object of my invention is to provide novel and improved apparatus for converting articles of a large size to discrete quantities.

A still further object of my invention is to provide novel and improved apparatus for converting plastic and semiplastic articles into smaller homogenous particles of such material.

These and other objects of my invention will become apparent from a consideration of the appended specification, claims and drawings, in which:

FIG. 3 is an enlarged sectional view of a fragmentary portion of the apparatus shown in FIG. 1 taken along section line 3—3;

FIG. 4 is an enlarged partial sectional view of the apparatus of FIG. 1 taken along section line 4—4;

FIG. 5 is an enlarged sectional view of the apparatus in FIG. 2 taken along section line 5—5;

FIG. 6 is an enlarged fragmentary view of the apparatus shown in FIG. 5;

FIG. 7 is an enlarged fragmentary view of a portion of my invention;

FIG. 8 is an enlarged sectional view of FIG. 7 taken along section line 8—8;

FIG. 10 is a fragmentary front elevation view of a further embodiment of a material modifying means;

FIG. 11 is a fragmentary rear elevation view of a portion of FIG. 10.

FIG. 12 is a sectional view of a portion of FIG. 10 taken along section line 12—12; and FIG. 13 is a sectional view of a portion of FIG. 10 taken along section line 13—13.

Figure 1:
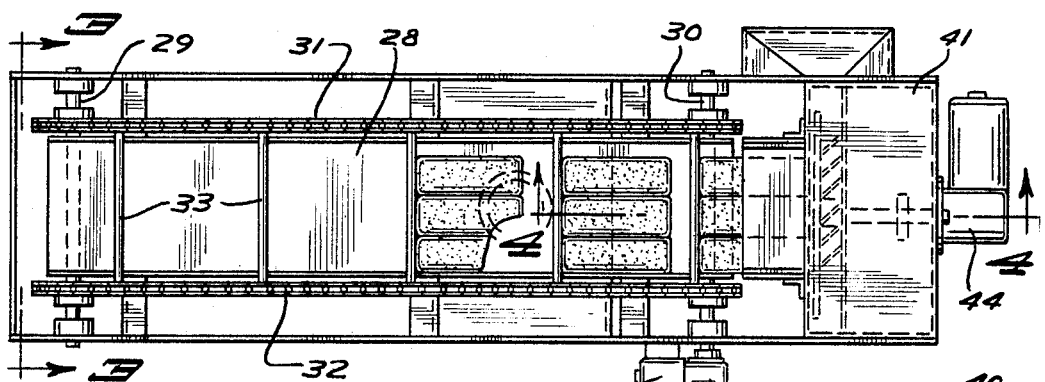
FIG. 1 is a top plan view of apparatus embodying the principles of my invention.
Figure 2:
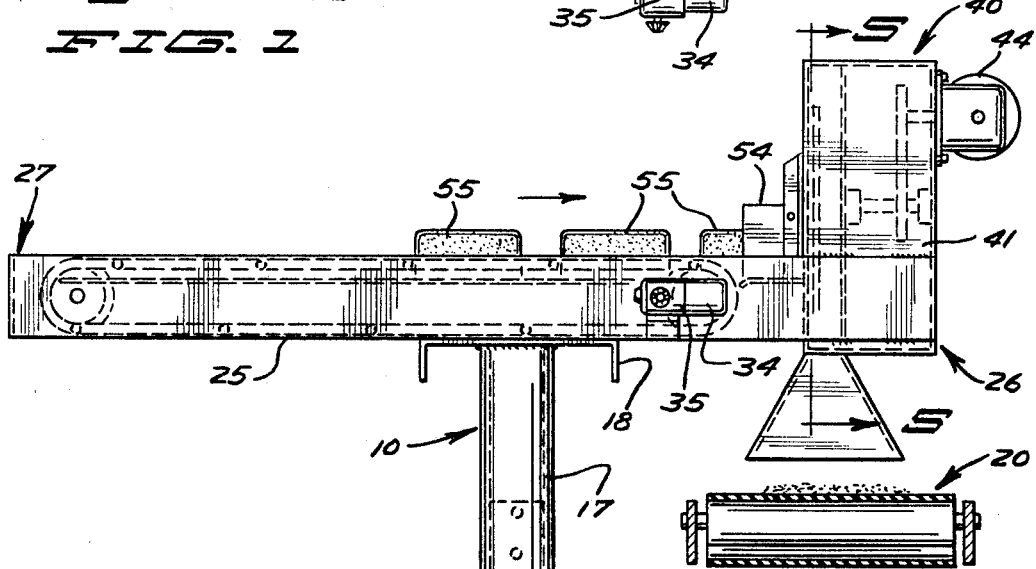
FIG. 2 is a side elevation view of the apparatus of FIG. 1 shown in operative relationship to further conveyor means for receiving modified articles.

Referring now to the drawings, there is shown an adjustable support indicated generally by reference character 10 which is comprised of a lower base member 11, a socket 12 securely disposed on base member 11, an intermediate column member 14 having a plurality of longitudinally spaced holes 16 at its upper end and securely affixed to socket 12 by bolt 13. A further telescoping column member 15 is shown disposed in slidable relationship with the top of column member 14 and is held at a predetermined elevation with respect to base 11 by bolt 15. A further top frame supporting member 18 extends transversely and generally horizontally of the top of telescoping column member 17. A fragmentary portion of a modified material receiving conveyor 20, disposed to the left of adjustable support 10 in FIG. 2 of the drawings is shown for illustrative purposes only as one manner in which modified material might be received from the apparatus to be described below.

A generally longitudinally elongated frame member 25 is shown disposed in a horizontal position on top support member 18 and includes a discharge end 26 and an article receiving end 27.

An article support member 28 for slidably receiving articles to be modified is stationarily disposed along receiving end 27 and intermediate the longitudinal sides of frame member 25. A pair of rotatable shaft members 30 and 29 are disposed at opposite ends of the article support member 28 and are provided with suitable sprocket or drive members for receiving continuous conveyor chains 31 and 32 disposed for longitudinal movement adjacent each edge of article support 28. Conveyor chains 31 and 32 are provided with suitably spaced complementary disposed, laterally extending pusher bar links which are adapted to engage articles to be modified for continuously conveying the articles along article support member 28 along article receiving end 27 of frame 25 to the discharge end 26 thereof. Shaft 30 is shown drivingly connected to a gear head motor 34, having an adjustable speed control mechanism 35, connected thereto.

An article modifying means indicated generally by reference character 40 is shown rigidly attached and extending generally vertically of discharge end 27 of frame 25. Article modifying means 40 includes a generally rectangular shroud or housing 41 and is provided with a centrally disposed shaft 42 journaled for rotation in suitable bearing means 45 and 46 attached to the front end and intermediate partition plate 51 respectively. A gear head drive motor 44 is shown attached to a suitable chain drive 43 to rotate shaft 42.

An article modifying disc assembly comprised of cutting disc 48 and disc 47, having a plurality of radially extending slots 49, are suitably nonrotatably mounted on the left end of shaft 42 in proximity to an aperture defined by, and surrounded by, an axially extending article guide member 54. Disc 48 is also provided with a plurality of cutter members or portions 50 that are disposed in radial alignment in a generally involute or spiral pattern. A plurality of knife-like, cutting members are suitably mounted on the lower portion of the left side of baffle plate 51 and extend at an angle directed toward the direction of rotation of discs 47 and 48 and extend into proximity to the right hand face of disc 47. A suitable discharge chute 53 may be disposed below the chamber defined by the left end of housing 41 and baffle plate 51.

Figure 9:
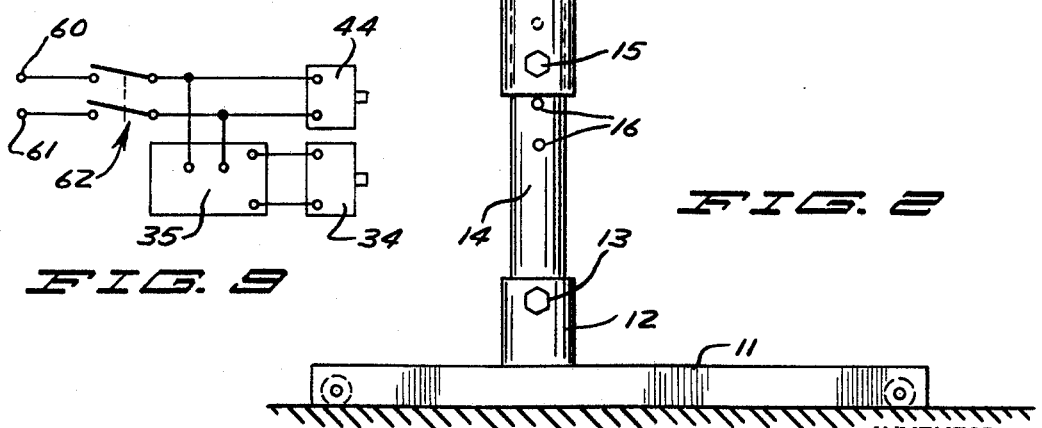
FIG. 9 is a schematic and diagrammatic representation of the electrical control portion of my invention.

In FIG. 9, an electrical schematic diagram shows a pair of terminals 60 and 61 adapted for connection to a suitable source of electrical energy (not shown) that are in turn connected to a single-throw double pole switch 62 having movable contacts connected to input terminals on motor 44 and input terminals on speed control device 35 which is in turn connected through suitable conductors to input terminals on motor 34.

Operation

In operation, switch 62 is actuated to energize motor control 35 and motor 34 which causes shaft 30 to rotate and thereby drive chain link members 31 and 32 and bars 33 in a direction that will cause articles of material, 55, to be conveyed toward article modifying means 40. Simultaneously, motor 44 is energized to cause shaft 42 to rotate and thereby cause disc 47 and 48 to rotate in the direction indicated on, for example, FIG. 5 of the drawings. As the ends of the articles are brought into contact with the left side of disc 48, cutter members 50 continuously sever the end portions of articles 55 to thereby modify the shape and size of the material. The severed material then passes into slots 49 disposed to the right of the radial pattern of cutter members 50 and thence into contact with knife members 52. The modified material then falls, under the influence of gravity, into discharge chute 53 onto, for example, conveyor 20 or any other convenient temporary material retaining device, such as a tray or the like.

In one operative embodiment of my invention, satisfactory operation was observed to occur in the shredding of cheese wherein the article modifying means was operative at a speed of 200 r.p.m. and the article conveying means was operative at a linear speed of approximately 4 ft./min.

The size of the modified articles is, of course, dependent on the relative speed of the modifying means and the article conveying means as determined by the particular setting or calibration of speed control means 35.

As indicated above, one of the features of my invention is the provision of a motor drive 34 for the article conveying portion of the apparatus that has a substantially lower torque output capacity than motor drive 44 for the article modifying means so that motor 34 will stall long before any damage might be incurred by article modifying means 40 or any other portion of the apparatus. Motor 34 may conveniently be a series wound universal type and motor control means 35 may be of the class utilizing silicon controlled rectifiers in combination with suitable conduction control elements therefor.

It should also be noted that the lateral spacing of knife members 52 disposed in article modifying means 40 will govern, to a great extent, the length of shreds of material that will be provided where the articles to be modified consists of plastic-like material that will flow under pressure, such as cheese and the like.

It may also be obvious to those skilled in the art to which my invention pertains, that shroud 41 may be constructed to provide periodic access to the interior of article modifying end 26 of frame member 25 and that other suitable height adjusting mechanisms may be substituted for support assembly 10.

FIGS. 10–13 illustrate a second embodiment of an article modifying disc that may be used in article modifying means 40. An article modifying disc 70 is shown having a hub 72 and a plurality of radial slots 71 which are disposed to be nonparallel, or at an angle, with respect to the axis of rotation of the disc. A continuous corrugated, knife-like article modifying member 73, having a plurality of corrugations 75, is stationarily disposed in each of slots 71 and adjustably, stationarily held in operative position by suitable clamping members 72. Article modifying members 73 are shown having a tapered rear end that is preferably disposed within slots 71 adjacent the rear surface of disc 70 and having a forward end that is substantially perpendicular to the longitudinal axis thereof and which is positioned so that the corrugations are disposed to extend slightly forwardly of the front surface of disc 70.

It is understood that suitable modifications may be made in the structure as disclosed, provided such modifications come within the spirit and scope of the appended claims.

Having now therefore fully illustrated and described my invention, what I claim to be new and desire to protect by Letters Patent is:

1. In apparatus of the class above described including a support means having a generally horizontal frame member, an article receiving end and an article modifying end, means for continuously conveying articles from the receiving end to the article modifying end, said last named means including adjustable driving means therefor, and rotatable article modifying means including a disc having a plurality of apertures and a like plurality of forwardly extending article engaging portions which, upon engagement with an article, sever portions of said article and deliver the same therethrough to the rear surface of said disc, said article modifying means disposed adjacent the article modifying end of the support means, and including drive means therefor, the combination comprising; controlling means connected to the driving means for conveying articles to be modified, said controlling means including means for effecting variable relative speed of one of said driving means with respect to the other of said driving means; and at least one knife member is disposed immediately adjacent the rear surface of said disc.

2. The apparatus of claim 1 in which the article engaging portions of the disc are disposed in successive increasing radially outwardly disposed relationship so as to provide an overlapping spiral pattern.

3. The apparatus of claim 1 in which the knife member is adjustably mounted for movement axially of the disc.

References Cited

UNITED STATES PATENTS

| | | | |
|---|---|---|---|
| 1,972,735 | 9/1934 | Fischer | 241—92 |
| 2,034,951 | 3/1936 | McArdle et al. | 241—92 |
| 2,460,901 | 2/1949 | Newman | 146—177 |
| 2,477,198 | 7/1949 | Murray | 146—177 |
| 2,856,976 | 10/1958 | MacDougall | 146—177 X |
| 2,978,191 | 4/1961 | Kingery | 146—110 X |
| 3,035,621 | 5/1965 | Burcham | 146—110 X |

JAMES M. MEISTER, Primary Examiner

U.S. Cl. X.R.

146—110, 177; 241—92